United States Patent [19]

Höfgen

[11] 4,197,542
[45] Apr. 8, 1980

[54] RADIO NAVIGATION SYSTEM

[75] Inventor: Günter Höfgen, Kornwestheim, Fed. Rep. of Germany

[73] Assignee: International Standard Electric Corporation, New York, N.Y.

[21] Appl. No.: 892,381

[22] Filed: Mar. 31, 1978

[30] Foreign Application Priority Data

Apr. 6, 1977 [DE] Fed. Rep. of Germany ........ 2715383

[51] Int. Cl.² .............................................. G01S 1/46
[52] U.S. Cl. ................................ 343/102; 343/106 R; 343/113 R
[58] Field of Search ............. 343/100 SA, 102, 106 R, 343/113, 114, 854

[56] References Cited

U.S. PATENT DOCUMENTS

| | | | |
|---|---|---|---|
| 3,474,447 | 10/1969 | Melancon | 343/106 R |
| 3,500,412 | 3/1970 | Trigon | 343/100 SA |
| 3,731,315 | 5/1973 | Sheleg | 343/854 |
| 3,797,019 | 3/1974 | Shestag et al. | 343/106 R |
| 3,858,218 | 12/1974 | Masak et al. | 343/100 SA |
| 3,964,066 | 6/1976 | Nemit | 343/100 SA |
| 4,052,723 | 10/1977 | Miller | 343/100 SA |

OTHER PUBLICATIONS

*Proceedings of the IEEE*, "A Matrix Fed Circular Array for Continuous Scanning", by Boris Sheleg, vol. 56, Nov. 1968, pp. 2016-2027.

*Primary Examiner*—Maynard R. Wilbur
*Assistant Examiner*—Richard E. Berger
*Attorney, Agent, or Firm*—Thomas L. Peterson

[57] ABSTRACT

An electronic navigation system ground station, which may be either an omni-range beacon (such as VOR) or a passive direction finder. A circular array of antenna elements has a feed arrangement which includes switched programming of at least one discrete set of phase shifters to effect successively changed phase-rotation fields for minimizing the adverse effects of multipath signals between the ground station and a remote station, aboard an aircraft for example.

7 Claims, 3 Drawing Figures

RADIO NAVIGATION SYSTEM

BACKGROUND OF THE INVENTION

The present invention relates to radio navigation systems generally and, more particularly, to such systems utilizing an element antenna in which said elements are arranged in a circle and adapted for receiving direction finding or active omnidirectional operation.

A radio navigation system of the general type is known, for example, from German Pat. No. 1,123,000. The radio navigation system described therein can be an omnidirectional range or a direction finder. A direction finder is basically a receiving system which determines the angle of arrival of a received signal. An omnidirectional range radiates a signal from which the bearing to that facility can be determined by airborne apparatus.

Of the various prior art approaches for omnidirectional range implementation, VOR and TACAN are two which have been introduced throughout the world and are of great importance in modern air navigation. The signals radiated from those omnidirectional range facilities must meet requirements set forth in rigid specifications.

The principle of an omnidirectional range involves ground station transmission of a direction-dependent signal which is evaluated as azimuth information with the aid of a suitable airborne receiving apparatus. In VOR (VHF omnidirectional range), which will be explained representatively for the general class of omnidirectional ranges, the direction-dependent signal is a 30 Hz wave whose phase position relative to a reference wave corresponds to the azimuth. By rotating a VHF figure-8 directional pattern (e.g. of a dipole) at 30 rps (transmitted frequency range 108 MHz to 118 MHz) a 30 Hz amplitude modulation (AM) is effectively produced in the field, the direction-dependent signal thus being radiated. For the azimuth evaluation in the airborne receiver, the ground station transmits an additional 30 Hz reference signal. The latter is contained as frequency modulation (FM) in a 9,960 Hz subcarrier wave with a frequency deviation of ±480 Hz, with which the aforementioned VHF carrier is amplitude-modulated. In this manner, the direction-dependent signal and the reference wave, which are of the same frequency, are well isolated from each other. The airborne receiver evaluates the phase difference between these two 30 Hz waves; this difference being the azimuth or bearing information. Phase equality between the direction-dependent and reference signals is pre-set in the direction of magnetic north, typically. The carrier is also amplitude-modulated with speech (300 Hz to 3,000 Hz) ground station and identification (1,020 Hz).

Depending on the surroundings at the site of the omni-range station, site errors occur during evaluation. These errors are caused by reflection of the radiated signal from obstacles in the propagation path and may produce unacceptably large errors. In severe cases, information containing the azimuth of the reflector in addition to the direct azimuth information appears at the receiving station. Vector addition produces an error whose magnitude is dependent on the relative amount of reflected radiation, on the radio-frequency phase difference between direct and reflected signals, and on the difference between receiver and reflector azimuths.

Because of these possible errors, a VOR must always be located in a place where the site error is negligible. Such a location cannot always be found, however. One further development of VOR is the so-called Doppler VOR, which affords great reduction of site error. Doppler VOR is described in the above referred-to patent specification and is compatible with the VOR. The Doppler VOR can be located even on terrain with many obstructions.

By reciprocity, it will be realized that in direction finders, too, the measurement result may be invalidated by errors caused by multipath propagation if the facility is located on terrain with many obstructions. By application of the Doppler principle, much in the same way as in the Doppler VOR, these errors are nearly eliminated. Doppler direction finders are also described in the aforementioned reference.

Notwithstanding their performance advantages, both the Doppler VOR and the Doppler direction finder are wide-base systems and, therefore, occupy much space. In addition, those radio navigation systems are very expensive to construct and operate. The text "Funksysteme für Ortung und Navigation", Verlag Berliner Union GmbH, Stuttgart, FRG, 1973 (pages 131 to 139) and the text "Electronic Avigation Engineering" by Peter C. Sandretto, published by International Telephone and Telegraph Corporation, 1958, are useful references for VOR background.

SUMMARY

It may be said to have been the general object of the invention to provide an improved navigation system in which measurement accuracy is not appreciably affected by errors caused by multipath propagation and which is relatively less difficult to construct.

This object is achieved by the means hereinafter described.

ADVANTAGES

The novel concepts according to the invention can apply to navigation systems, either of the omnidirectional range or direction finder type. When used as an omnidirectional range, it may be designed as a VOR or TACAN omnidirectional range, for example. The novel omnidirectional ranges and direction finders are much lower in cost than the Doppler VOR and the Doppler direction finder, respectively.

The invention may be broadly described as a radio navigation system with an antenna and a transmitter or at least one receiver, the antenna comprising n elements arranged in a circle, characterized in that, when the system is used as an omnidirectional range, all elements of the antenna are fed simultaneously with at least one radio-frequency signal [CAR(mod), USB, LSB], that the radio-frequency signal is fed to at least n-1 elements through at least one controllable phase shifter, and that there is provided a switching device common to all phase shifters which switches these phase shifters so that different radio-frequency phase-rotation fields are produced in succession, a radio-frequency phase-rotation field being defined by the fact that the signals at adjacent elements have different rf phases which are chosen so that the differences between the rf phases of the signals at adjacent elements are equal and that the sum of the rf phase differences along the circle equals 360° or an integral multiple thereof.

DETAILED DESCRIPTION

The navigation system according to the invention will be described first in an omnidirectional range and then in a direction finder. The omnidirection range will be described as a VOR.

Figure 1:
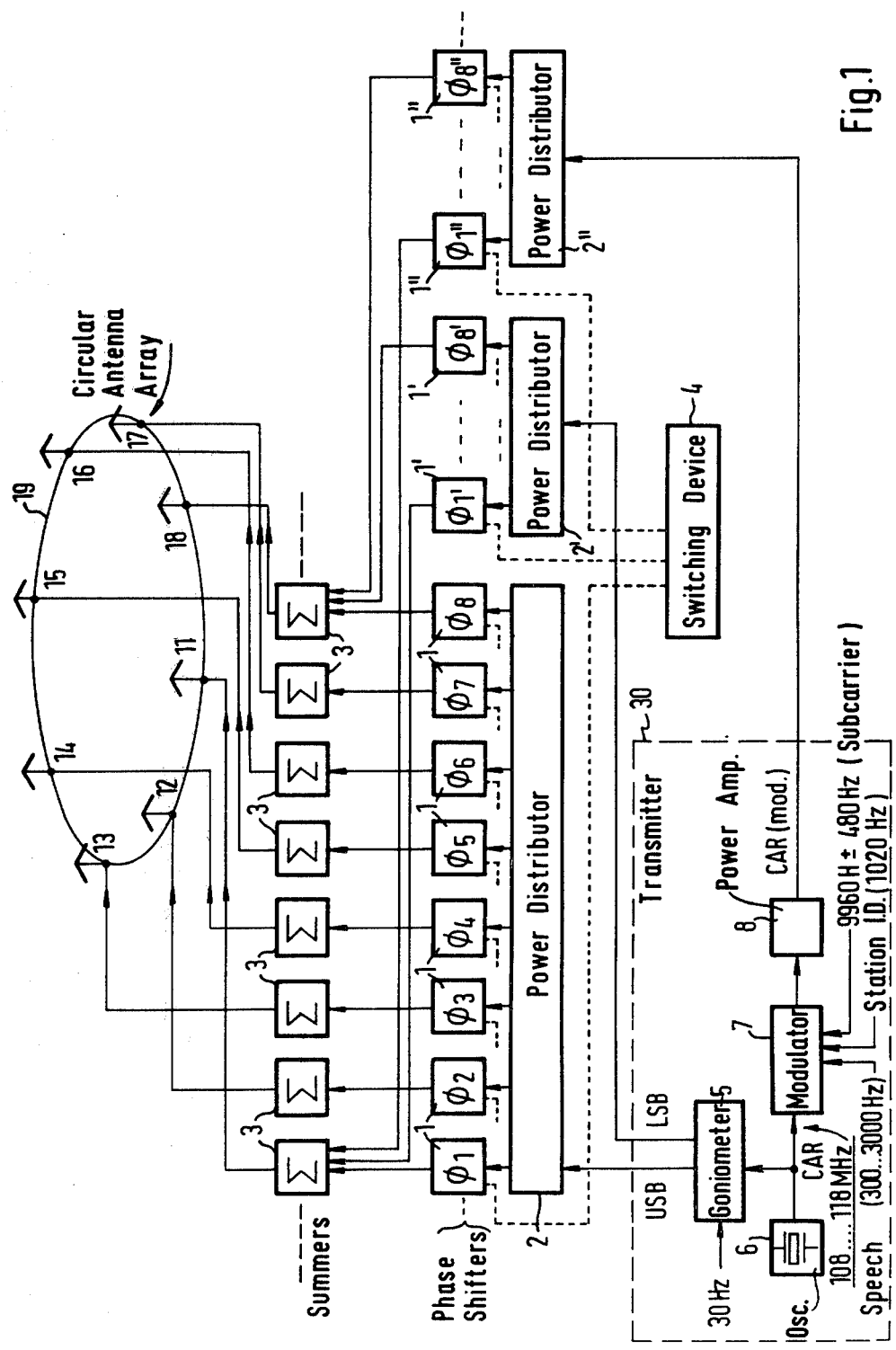
FIG. 1 is a block diagram of an omnidirectional range embodying the invention.

Referring now to FIG. 1, the schematic block diagram of the VOR constructed according to the invention will be seen to include a transmitter 30 which includes at least one oscillator 6, one modulator 7, one power amplifier 8, and one goniometer 5. External apparatus for generating the subcarrier and modulating signals applied to modulator 7 are those well known in the art. The entire transmitter 30 is also generally known and will therefore be described only in brief.

The oscillator 6 generates the carrier wave CAR at the frequency $f_o$ ($f_o$ lies between 108 and 118 Hz). This carrier wave CAR is modulated in the modulator 7 and amplified in the power amplifier 8. The modulating signals are: a subcarrier with a frequency of 9,960 Hz ±480 Hz (9,960 Hz frequency-modulated with 30 Hz), speech (300 to 3,000 Hz), and the ground station identification signals (1,020 Hz). Aboard the aircraft, the 30 Hz signal with which the subcarrier is frequency-modulated serves as the 30 Hz reference signal. In the following description, the modulated and amplified carrier signal will be referred to as "CAR(mod)" for simplicity.

Part of the output signal of the oscillator 6 is also applied to the goniometer 5, which is additionally fed with a 30 Hz signal. In the goniometer, which contains two power amplifiers, an upper 30 Hz sideband USB and a lower 30 Hz sideband LSB of the carrier wave CAR are generated in the known manner.

The sidebands USB, LSB and the carrier CAR(mod) generated in the transmitter 30 are fed through respective power distributors 2, 2', 2", phase shifters 1, 1', 1", and summing elements (summers) 3 to an antenna which consists of elements 11 to 18 arranged in a circle 19. In the embodiment, it is assumed that the circle 19 has a diameter of one wavelength of the radiated signal, and that eight elements, as illustrated, are equally spaced on the circle.

The summers 3 are necessary because each antenna element is fed with three different signals, these three signals [USB, LSB, CAR(mod)] being added up in the summing elements 3. Similarly, three power distributors and three phase-shifter arrangements are needed. These are of like construction, and it will therefore suffice to explain only one power distributor 2 and one phase-shifter arrangement (8 shifters) 1. This first power distributor/phase-shifter arrangement is fed with the upper sideband USB.

Since eight antenna elements 11 to 18 are provided, the power distributor 2 has eight outputs each of which is followed by a controllable phase shifter 1. The phase shifters 1 are fixed units, each of which produces a discrete phase shift so that eight different phase shifts $\phi 1$ to $\phi 8$, as discretely controlled by switching device 4, are feasible. The drawing shows a dotted control line for the first phase shifter only. The other phase shifters fed from 2 are to be understood to be also controlled via similar control lines.

The switching device 4 also controls the other phase shifter banks 1' and 1", which are fed with the lower sideband LSB and the carrier CAR(mod), respectively. Only one dotted control line is shown for the phase shifters 1', and one for the phase shifters 1", but the comments in respect to phase shifter bank apply as to additional phase shifter control lines. The time at which switchover from one state to another takes place is the same for all phase shifters, i.e. the phase shifter banks 1, 1' and 1" are synchronously controlled, one from each bank carrying signal at any one time. The switching sequence may be effected at a rate of 10 Hz, for example.

Prior to describing the concept of generation of radio-frequency, phase-rotation fields by suitable control of the phase shifters, and the manner in which switchover is effected between different phase-rotation fields, the terms used will be explained. These terms will also be used hereinafter in describing the direction finder embodiments, wherein excitation signals are replaced by received signals. What is said about the rf phases of the signals at the antenna elements of the omnidirectional range applies analogously in the direction finder to the rf phases of the signals at the inputs of a summing element in which the signals received from the antenna elements are added together. As in the omnidirectional range embodiment (FIG. 1), these signals are assigned to the individual antenna elements on the circle.

A radio-frequency phase-rotation field is present when the radio-frequency phase of a feed signal is different for each antenna element, when the incremental differences of the rf phases between adjacent antenna elements are equal, and when the sum of the rf phase differences about the circular array is equal to 360° or an integral multiple thereof.

The phase-rotation field is dextrorotatory when the rf phases at the antenna elements increase clockwise, and levorotatory when these rf phases decrease clockwise. This is illustrated by the following example:

| Antenna | 1 | 2 | 3 | (clockwise) |
|---|---|---|---|---|
| Rf phase | 0° | 45° | 90° | dextrorotatory |
| Rf phase | 0° | −45° or 315° | −90° or 270° | levorotatory |

A radio-frequency phase-rotation field in which an n×360° phase shift is produced about the circular array is an nth-order phase-rotation field. According to this definition, a zeroth order phase-rotation field is present when all elements are fed in phase, however, this is not a radio-frequency phase rotation field in the lateral sense.

Tables 1 and 2 show what radio-frequency phase-rotation fields must be produced, between which radio-frequency phase-rotation fields switching must take place, and how the phase shifters are selected to accomplish this.

Table 1

| State | V | W | X | Y | Z |
|---|---|---|---|---|---|
| LSB | 3 × 360° levorotatory | 2 × 360° levorotatory | 1 × 360° levorotatory | 0° | 1 × 360° dextrorotatory |
| CAR(mod) | 2 × 360° | 1 × 360° | 0° | 1 × 360° | 2 × 360° |

Table 1-continued

| State | V | W | X | Y | Z |
|---|---|---|---|---|---|
| USB | levorotatory 1 × 360° levorotatory | levorotatory 0° | 1 × 360° dextrorotatory | dextrorotatory 2 × 360° dextrorotatory | dextrorotatory 3 × 360° dextrorotatory |

Table 2

| State | Phase at the element | | | | | | | |
|---|---|---|---|---|---|---|---|---|
| USB | 0 ($\phi 1$) | 315 ($\phi 2$) | 270 ($\phi 3$) | 225 ($\phi 4$) | 180 ($\phi 5$) | 135 ($\phi 6$) | 90 ($\phi 7$) | 45 ($\phi 8$) |
| CAR(mod) V | 0 ($\phi 1'$) | 270 ($\phi 2'$) | 180 ($\phi 3'$) | 90 ($\phi 4'$) | 0 ($\phi 5'$) | 270 ($\phi 6'$) | 180 ($\phi 7'$) | 90 ($\phi 8'$) |
| LSB | 0 ($\phi 1''$) | 225 ($\phi 2''$) | 90 ($\phi 3''$) | 315 ($\phi 4''$) | 180 ($\phi 5''$) | 45 ($\phi 6''$) | 270 ($\phi 7''$) | 135 ($\phi 8''$) |
| USB | 0 | 90 | 180 | 270 | 0 | 90 | 180 | 270 |
| CAR(mod) Y | 0 | 45 | 90 | 135 | 180 | 225 | 270 | 315 |
| LSB | 0 | 0 | 0 | 0 | 0 | 0 | 0 | 0 |

In Table 1, it is assumed by way of example that switching is effected between five states V, W, X, Y and Z. In each state, the ordinal numbers of the rotation fields of the upper (USB) and lower (LSB) sidebands are, respectively, lower and higher than the ordinal number of the phase-rotation field of the carrier by 1. This is necessary in order to obtain a signal which meets VOR specifications. For error reduction, however, this is not sufficient. Error reduction requires that phase-rotation fields of different order be used successively for the carrier (CAR(mod)), with the above prerequisite still being fulfilled. In the present example, switching is effected from one order to the next. This is not the prerequisite, however.

With the aid of equations describing the radiated signals, it will be explained why this results in a reduction of errors. The designations used in the equations have the following meanings:

$E_{USB}$, $E_{CAR(mod)}$, $E_{LSB}$: Magnitudes of field strengths of the upper sideband, the modulated carrier, and the lower sideband, respectively, at the receiving station.

$E_O$: Magnitude of field strength of the unmodulated carrier signal.

m: Modulation factor.

$\omega$: Angular frequency of the rf wave ($\omega = 2\pi \times 30$ Hz).

$\theta_N$: Azimuth of the desired signal.

$\Omega$: Angular frequency of the carrier.

$\phi_N$: Carrier phase of the desired signal.

k: A factor determining reflectance ($k << 1$).

$\theta_S$: Azimuth of undesired signal.

$\phi_S$: Carrier phase of the undesired signal.

n: Ordinal number of the radio-frequency phase-rotation field.

t: Time.

At the receiving station, the following three desired signals are obtained when where are no interferences caused by reflected signals:

$$E_{USB} = (m/2)(E_o) \cos [(\Omega + \omega) t + (n+1)\theta_N + \theta_N]$$

$$E_{CAR(mod)} = (E_o) \cos [\Omega t + n\theta_N + \phi_N]$$

$$E_{LSB} = (m/2)(E_o) \cos [(\Omega - \omega)t + (n-1)\theta_N + \phi_N]$$

These three components add up to the desired sum signal $E_N$, as follows:

$$E_N = E_o[1 + m \cos (\omega t = \theta_N)][\cos (\Omega t + \underline{n\theta_N} + \phi_N)].$$

This equation, with the exception of the underlined term, is in agreement with the accepted and well known definition of a VOR signal. The additional factor with the radio-frequency carrier phase does not affect the angle evaluation at the airborne receiving station.

If, in addition to the desired signal, a signal reflected from an obstacle (undesired signal) is present, this undesired signal $E_S$ is superimposed on the desired signal $E_N$. The undesired signal may be written as:

$$E_S = k \; E_o[1 + m\cos(\omega t + \theta_S)] \cos (\Omega t + n\theta_S + \phi_S).$$

The azimuth error $\Delta$ (in radian measure; $k << 1$) resulting from the superposition is $$\Delta = [k \sin (\theta_N - \theta_S)] \cos [n(\theta_N - \theta_S + (\phi_N - \phi_S)]$$

The phase difference $(\theta_N - \theta_S)$ is dependent on the propagation paths of the desired and undesired signals. In the known VORs (where n=0), maximum errors occur when $(\theta_N - \theta_S) = 0°$ (in that case, $\Delta = +66$ max), and when $(\theta_N - \theta_S) = 180°$ (then, $\Delta = -\Delta$ max). In the airborne receiver, the phase difference $(\theta_N - \theta_S)$ normally changes in flight, thus causing the variations in course indication (bends, scallopings) which have been observed in the prior art and which are particularly undesirable.

Unlike that of the prior art omnidirectional range (as hereinbefore stated), the error equation for the signal radiated from the omnidirectional range according to the invention contains the additional term for radio-frequency phase difference $n(\theta_N - \theta_S)$. That term is changed at a sufficiently fast rate (e.g. 5 to 30 Hz). As a result, the error $\Delta$ varies at a corresponding rate and can be greatly reduced by averaging performed in the airborne receiver. The switching sequence is advantageously chosen so that averaging takes place as a result of the relatively slow response times of the components and the display unit. The change in the rf phase difference is achieved by switching the ordinal number n. As the ordinal number n increases, the propagation error decreases. If switching takes place between five different ordinal numbers, the maximum error caused by multipath propagation will be reduced by a factor on the order of 3 to 5.

Table 2 shows (for two states) what phase shifts the phase shifters 1, 1', and 1'' must produce in order that the desired phase-rotation fields are obtained. It can be seen from Table 2 that all phase shifters are controlled invidually, and that the switching from one state to another takes place simultaneously in all phase shifters.

In the example given in Table 2, all phase-rotation fields arbitrarily begin at the element 11, although this is not necessary, however.

In the above-described embodiment, the antenna elements are arranged on the circle only. It is also possible, however, to dispose one of the elements in the center of the circle. In that case, the signals may be radiated as follows: The elements are fed simultaneously with one of the two sidebands USB, LSB and with the carrier CAR(mod). The carrier is radiated only by the elements on the circle, while the upper (USB) and lower (LSB) sidebands are radiated alternately by the elements on the circle and by the central element.

The states—two are assumed—are summed up in Table 3 (analogous to Table 1).

Table 3

| State | a | b |
|---|---|---|
| USB | 0° | 2 × 360° levorotatory |
| CAR(mod) | 1 × 360° dextrorotatory | 1 × 360° levorotatory |
| LSB | 2 × 360° dextrorotatory | 0° |

This signal used for a zeroth-order rotation field is radiated from the central element.

Besides the possibilities described, there are numerous other possibilities for variation in the format for radiating the signals. It must only be ensured that:

1. Radio-frequency phase-rotation fields are produced, and that
2. Switching is effected between different radio-frequency phase-rotation fields, it being necessary that the phase-rotation fields for the carrier be changed, and that the phase-rotation fields of the sidebands bear a given relationship to those of the carrier.

The omnidirectional range was described by the example of a VOR, but it may also be implemented as a TACAN omnidirectional range. The concept according to the invention may also be useful in future versions of the omnidirectional range.

The embodiments of a radio navigation system designed as a direction finder will now be described with the aid of FIGS. 2 and 3.

As in the omnidirectional range (FIG. 1), the antenna consists of a plurality of elements 11 to 18 arranged in a circle 19. In this embodiment, eight elements are provided, each assigned at least one controllable phase shifter 1, as in FIG. 1. All phase shifters are so controlled by a common switching device 4 that radio-frequency phase-rotation fields are produced, and that switching takes place between different radio-frequency phase-rotation fields.

Figure 2:
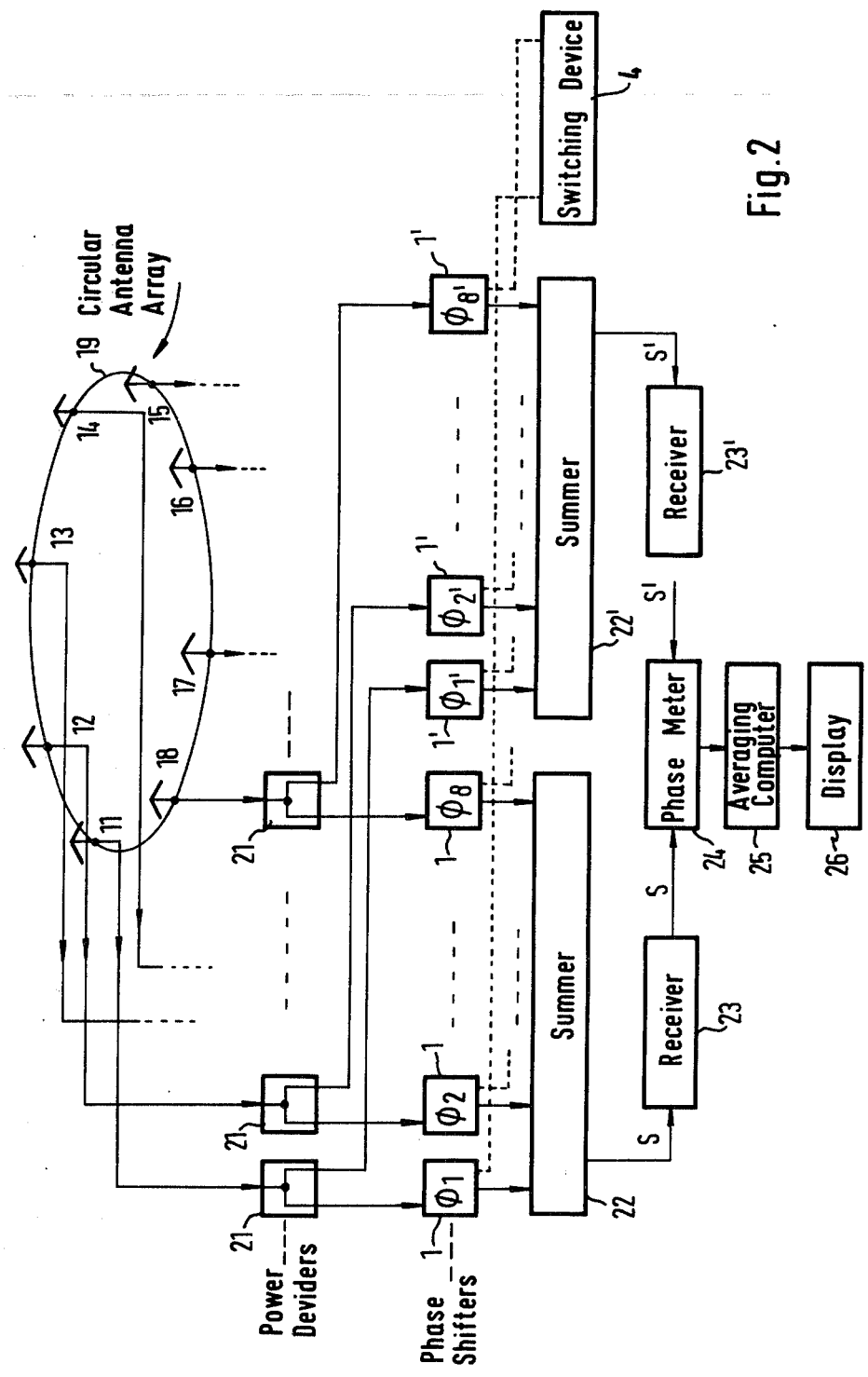
FIG. 2 is a block diagram of a direction-finder embodying the invention.

In the embodiment of FIG. 2, a power divider 21 is connected between each of the antenna elements 11 to 18 and each of the phase shifters 1, this dividing the signal received from the respective element into two equal signals. The first signals are applied to the aforementioned phase shifters 1, which produce phase shifts $\phi 1$ to $\phi 8$ (e.g., according to Table 2). Like in the omnidirectional range, these phase shifters produce a first radio-frequency phase-rotation field. The second signals of each of the power dividers are applied to controllable phase shifters 1' which produce phase shifters $\phi 1'$ to $\phi 8'$ (e.g., according to Table 2). These phase shifters 1' produce a second radio-frequency phase-rotation field and are also controlled by the switching device 4.

The output signals of the first phase shifters are fed to a first summer 22, and the output signals of the other phase shifters to a second summing circuit 22'. The output signals of the two summing circuits 22 and 22' are applied to receivers 23 and 23', respectively, and a phase meter 24 compares the phases of the two receiver output signals. The phase angle corresponds to the angle of signal arrival.

This angle can be indicated directly on a display unit 26. Advantageously, however, the measured angle is fed to an averaging computer 25 which averages the measurement result. Averaging is not necessary if the switching between the different high-frequency phase-rotation fields is effected fast enough to provide effective averaging due to component time constants. The indicator or display 26 will be understood to be the same type as commonly used for direction finding display.

When the received signal is $$E = E_o \cos(\Omega t + \phi),$$

the output signals S, S' of the summing circuits 22, 22', respectively, are given by $$S = E_o \cos[\Omega t + n\theta + \phi]$$

$$S' = E_o \cos[\psi t + (n-1)\theta + \phi],$$

it being assumed that, compared to the ordinal number of the rotation field produced by the second phase shifters 1', the ordinal number of the rotation field produced by the first phase shifters 1 is higher by 1. From the equation, it is apparent that the angle of signal arrival $\theta$ can be measured directly.

When the ordinal numbers of the two rotation fields differ by more than 1, the measurement result becomes ambiguous, but measurement accuracy increases. A state must therefore be provided in which the ordinal numbers differ by + or −1. This measurement result can be used in the computer to provide an unambiguous output.

Figure 3:
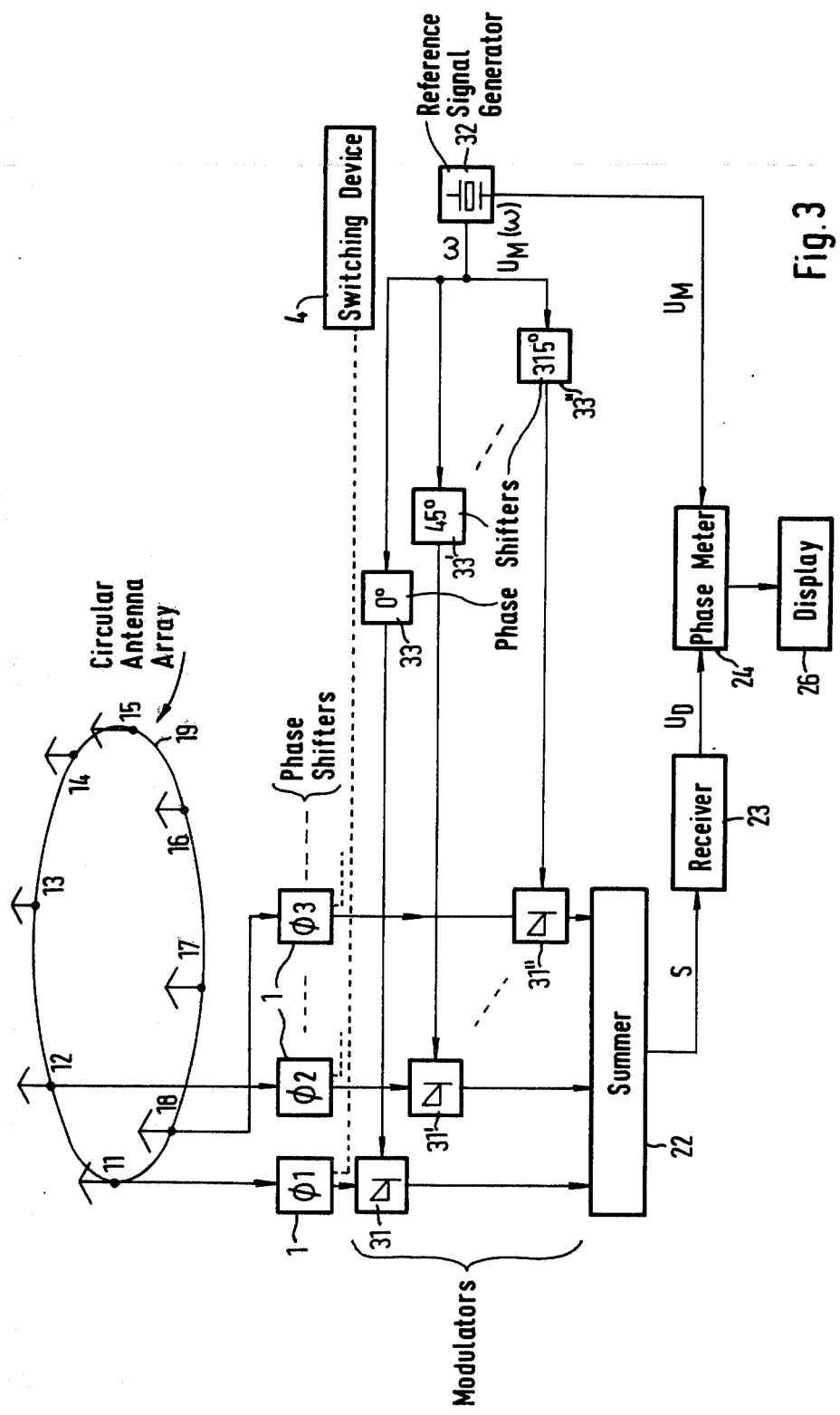
FIG. 3 is a block diagram of a second direction finder embodiment employing the invention.

In the embodiment of FIG. 3, the phase shifters 1 are not preceded by power dividers. The antenna elements 11 to 18 are followed directly by phase shifters 1 whose output signals are applied to modulators 31. The output signals of the modulators 31 are fed to a summing circuit 22. As in the embodiment of FIG. 2, the output signal of the summing circuit 22 is fed to a receiver 23 which is followed by a phase meter 24 and a display unit 26.

Each of the modulators 31 is fed with a low-frequency modulating signal of the frequency $\omega$ which is generated in a reference-signal generator 32. The low-frequency modulating signals for the individual modulators differ in phase in accordance with the location of the respective element 11 to 18 on the circle 19, these chosen phases being correspondingly provided by phase shifters 33, 33' and 33''.

Assuming that the antenna element 11, as viewed from the center of the circle, is located in the direction where the azimuth is 0°, the output signal of the phase shifter 1 following this element 11 (phase shift $\phi 1 = 0°$) is modulated in the corresponding modulator 31 with the modulating signal from 33 not shifted in phase.

Since, in the present case, eight elements are equally spaced on the circle 19, the output signal of the phase shifter following the second element 12 is modulated in the modulator 31, according to the position of this element 12 on the circle 19, with a modulating signal from 33' shifted in phase by 45°. Accordingly, the signal associated with the eighth element 18 is modulated with a modulating signal from 33" shifted in phase by 315°. It is also possible to choose a different assignment of the phase shifts and the method of modulation may be amplitude modulation, for example.

The output signal of the modulating-signal (reference) generator 32 is also fed as a reference signal to the phase meter 24.

When the signal received by the direction finder is $$E = E_o \cos(\Omega t + \phi),$$

the output signal of the summing circuit becomes $$S = E_o[1 + m \cos(\omega t + \phi) \cos(\Omega t + \theta + \phi)].$$

The demodulated receiver output signal $U_D$ can be defined by $U_D = U_{DO} \cos(\omega t + \phi)$, and the modulating signal $U_B$ by $U_B = U_{BO} \cos \omega t$. From this, it follows that the angle of signal arrival can be measured in the phase meter directly.

For signal averaging, the same remarks as those made in connection with the embodiment of FIG. 2 apply.

In addition to the embodiments described, there are other possibilities of realizing a direction finder. In all embodiments, it is essential that—like in the omnidirectional range apparatus—

1. radio-frequency phase rotation fields be produced, and
2. switching be effected between different radio-frequency phase-rotation fields.

What is claimed is:

1. An electronic navigational system which is relatively insensitive to transmission multipath errors adapted for at least one-way signal transmission for airborne identification of an azimuth angle between a ground station and a remote airborne station, comprising:
   an array of n antenna elements disposed about the circumference of a circle in the azimuth plane;
   feed means connected to said array comprising a network of a least n phase shifters each having first and second terminals, at least one for each of said antenna elements, with a first terminal of each of said phase shifters being connected to at least one of said antenna elements;
   switching means for controlling said phase shifters to produce radio-frequency phase-rotation in the field of said array, said switching means further being operative to program the operation of said phase shifters to produce successively different phase-rotation patterns;
   and means responsive to the second terminals of said phase shifters to provide at least one common feed terminal for the array and phase shifter network.

2. Apparatus according to claim 1 further defined in that said navigational system comprises an omni-range VOR ground station, said ground station including transmitting means for generating goniometer modulated upper and lower sideband signals and a carrier signal, said feed means including three sets of said phase shifters, each set having n phase shifters, and including n summing circuits each responsive to one phase shifter in each of said sets and having an output connected to drive a corresponding antenna element of said array, and in which said switching means synchronously controls all three sets of said phase shifters to produce said phase-rotation patterns.

3. Apparatus according to claim 1 in which said navigational system in which said ground station comprises a passive direction finder including n power dividers inserted between said antenna elements and said phase shifters and each having an input port connected to a corresponding one of said antenna elements, said power dividers each having two output ports; in which said phase shifters comprise first and second sets of n phase shifters each, one output of each of said power dividers being connected to one of said phase shifters in said first set and each other power divider output being connected to a corresponding phase shifter in said second set; in which two summing circuits are provided each having n inputs connected discretely to the outputs of said phase shifters, a common output for each of said summing circuits providing the inputs for separate direction finder receiver inputs, and in which said switching means is adapted to program said phase shifter sets separately to maintain different phase-rotation sequences for each of said sets.

4. Apparatus according to claim 1 in which n modulators are included connected on a one-for-one basis to said phase shifter outputs and means are included for providing a modulating signal of a relatively low reference frequency to said modulators discretely phase separated by a phase angle which is a function of the angular position of the corresponding antenna element position about said circumference of said circle in the azimuth plane; and a summing circuit connected to sum the modulated outputs of said modulators to provide an output to a direction-finding receiver.

5. Apparatus according to claim 4 in which said summing circuit output is connected to said direction-finding receiver and thereafter to a phase detection circuit detecting against said relatively low frequency modulating signal to provide an output signal representative of the angle of arrival of a signal received by said array.

6. Apparatus according to claim 3 further defined in that separate direction-finding receivers are provided, one responsive to the output of each of said summing circuits, and a phase detector responsive to the outputs of said receivers to develop an output signal representative of the angle of arrival of a signal received by said array.

7. Apparatus according to claim 5 or 6 in which averaging means are included associated with said phase detector for averaging out the effect of the phase-rotation switching.

* * * * *